United States Patent [19]
Rumpf et al.

[11] Patent Number: 5,525,203
[45] Date of Patent: Jun. 11, 1996

[54] PROCESS OF MANUFACTURING A SLIDING SURFACE BEARING

[75] Inventors: Thomas Rumpf, Gmunden; Reinhold Weber, Laakirchen, both of Austria

[73] Assignee: Miba Gleitlager Aktiengesellschaft, Laakirchen, Austria

[21] Appl. No.: 358,829

[22] Filed: Dec. 19, 1994

[30] Foreign Application Priority Data

Dec. 21, 1993 [AT] Austria ................ A 2578/93

[51] Int. Cl.$^6$ ............................................. C25D 7/10
[52] U.S. Cl. .................... 205/122; 205/149; 205/181
[58] Field of Search ........................... 205/122, 149, 205/181, 182

[56] References Cited

U.S. PATENT DOCUMENTS

| | | | |
|---|---|---|---|
| 2,333,227 | 11/1943 | Bagley, Jr. | 205/149 X |
| 4,599,147 | 7/1986 | Thompson | 205/122 |
| 5,156,729 | 10/1992 | Mahrus et al. | 205/104 |
| 5,364,523 | 11/1994 | Tanaka et al. | 205/128 |

FOREIGN PATENT DOCUMENTS 3727468   3/1989   Germany.

OTHER PUBLICATIONS

Frederick A. Lowenheim, *Electroplating*, McGraw–Hill Book Co., New York, 1978, p. 224.

*Primary Examiner*—John Niebling
*Assistant Examiner*—William T. Leader
*Attorney, Agent, or Firm*—Collard & Roe

[57] ABSTRACT

In the described process of manufacturing a sliding surface bearing comprising a backing shell of steel, a bearing metal layer on the backing shell, and a copper-containing sliding surface layer, which has been electrodeposited over said bearing metal layer, the backing shell is provided throughout its rear surface, which constitutes the rear surface of the bearing, with a tin-containing corrosion-resisting layer after the sliding surface layer has been deposited. To prevent a separation of the corrosion-resisting layer, it is proposed that the rear surface of the bearing is covered with an electrodeposited nickel layer before the sliding surface layer is deposited on the bearing metal layer or on an intermediate layer of nickel provided on the bearing metal layer.

3 Claims, No Drawings

PROCESS OF MANUFACTURING A SLIDING SURFACE BEARING

BACKGROUND OF THE INVENTION

1. Field of the Invention

This invention relates to a process of manufacturing a sliding surface bearing comprising a backing shell of steel, a bearing metal layer on the backing shell, and a copper-containing sliding surface layer, which has been electrodeposited over the bearing metal layer, wherein the backing shell is provided throughout its rear surface, which constitutes the rear surface of the bearing, with a tin-containing corrosion-resisting layer after the sliding surface layer has been deposited.

2. Description of the Prior Art

To deposit the sliding surface layer over the bearing metal layer, which usually consists of a copper or aluminium alloy, a plurality of backing shells to which the bearing metal layer has been applied by casting or cladding are axially clamped together and immersed in a suitable electrodeposited bath. In general, the sliding surface layer is not directly deposited on the bearing metal layer but is electrodeposited on an intermediate layer, which consists of nickel or a nickel alloy and serves as a diffusion barrier or a primer. Whereas the backing shells are so arranged in the electrodeposition bath that the sliding surface layer can be electrodeposited only on the bearing metal layer or on the intermediate layer, the fact that the copper which is dissolved in the electrolyte from which the sliding surface layer is electrodeposited has a higher electric potential than the iron of the backing shell will result in a deposition of copper metal on the rear surface of the backing shell. For this reason a layer of tin or a tin alloy must be deposited on said copper layer to protect the rear surface of the bearing from corrosion. In that case diffusion processes will result particularly under the action of heat in the formation of a brittle copper-tin phase, which owing to the changes of volume will give rise to internal stresses in the multilayer composite thus formed. Because owing to the cementation of the copper the adhesion between the copper layer and the backing shell of steel is relatively low, the internal stresses may cause the corrosion-resisting layer and the copper layer to spall in part. The continual micromotion of the backing shells relative to the support on which the backing shells are held by an inteference fit will cause the detached material to migrate away under the conditions of the interference fit so that material comprising the detached material, the inevitably abraded iron, and oil coke will accumulate in certain regions on the rear surface or the backing shell. Such accumulated material will disturb a uniform distribution of load so that the wear of the sliding surface layer will be increased and the sliding surface layer may suffer fatigue fractures in those regions.

In sliding surface bearings comprising an aluminium-base bearing metal layer and a sliding surface layer consisting of a zinc-phosphate alloy it is desired to avoid a deposition of a zinc-phosphate layer on the rear surface of the backing shell of steel during the electrodeposition of the sliding surface layer. To that end it is known from Published German Patent Application 37 27 468 to coat the backing shell on its rear surface with a layer which will prevent a deposition of a zinc-phosphate layer and which before the deposition of the sliding surface layer is removed from the surface on which the sliding surface layer is to be deposited. It is proposed to make such protecting layers from various materials, such as tin, copper, lead, nickel, and chromium. But the proposal to prevent by the provision of a protecting layer the undesired formation of a metal layer on the rear surface of the bearing cannot be adopted to prevent a cementation of copper because economically satisfactory protecting layers For that purpose are not known.

SUMMARY OF THE INVENTION

It is an object of the invention so to improve a process which is of the kind described first hereinbefore and serves to manufacture a sliding surface bearing that a spalling of the corrosion-resisting layer from the rear surface of the backing shell will be avoided.

The object set forth is accomplished in accordance with the invention by covering the rear surface of the bearing with an electrodeposited nickel layer before the sliding surface layer is deposited on the bearing metal layer or on an intermediate layer provided on the bearing metal layer.

Whereas a cementation of copper on the rear surface of the backing shell cannot be prevented by an electrodeposited nickel layer on the rear surface of the backing shell, such an electrodeposited nickel layer will surprisingly result in a much higher adhesion of the copper layer on the rear surface of the backing shell so that the corrosion-resisting layer will not be detached in spite of the internal stresses resulting from the formation of a layer by a diffusion between the tin-containing corrosion-resisting layer and the cemented copper. For that purpose the backing shell must be covered throughout its rear surface with a continuous nickel layer, which must be deposited in a sufficient thickness because the deposition of copper metal will cause nickel to be dissolved in an amount depending on the molar volumes. The thickness in which the copper layer is formed will depend on various parameters, such as the copper content of the electrolyte, the temperature, the velocity of flow, and the treating time. This fact must be taken into account in the selection of the thickness in which the rear nickel layer is deposited. After the cementation of the copper on the rear nickel layer the rear nickel layer should have a thickness of 0.5 to 2 micrometers to comply with the requirement to improve the adhesion not only to the cemented copper but also to the copper-tin phase being formed if an intermetallic bond is formed between the entire copper metal and the tin which has migrated by diffusion from the corrosion-resisting layer. After the deposition of the corrosion-resisting layer, which usually has a thickness of about 1 micrometer and in any case has a thickness not in excess of 2 micrometers the nickel layer which in accordance with the invention is provided between the backing shell of steel and the copper layer or a copper-tin phase will ensure a much more reliable fixation of the backing shell in the support for the bearing so that the overall reliability of the bearing will greatly be improved, particularly because a separation of the corrosion-preventing layer will reliably be prevented.

If an intermediate layer of nickel is provided in the usual manner as a diffusion barrier of primer between the bearing metal layer and the sliding surface layer, it will be desirable to deposit the nickel layer on the rear surface of the bearing as the intermediate layer is deposited on the bearing metal layer so that a separate operation will not be required. But in that case it may be necessary to deposit nickel layers having different thicknesses on the bearing metal layer and on the rear surface of the bearing.

DETAILED DESCRIPTION OF THE PREFERRED EMBODIMENT

In the manufacture of a sliding surface bearing in accordance with an embodiment of the invention, a backing shell was provided, which consisted of steel and had an outside diameter of 52 mm, an axial length of 22 mm, and a wall thickness of 2.5 mm. A bearing metal layer consisting of an aluminum alloy (AlZn4.5Pb) was deposited on said backing shell by roll cladding in a thickness of 0.5 mm. After that bearing metal layer had been subjected to a conventional pretreatment comprising degreasing, etching, and rinsing, a thin zincate layer was electrodeposited on said bearing metal layer in preparation for the deposition of a nickel layer as a diffusion barrier and as a primer. In contrast to the manufacture of conventional sliding surface bearings of that kind the nickel layer was electrodeposited not only on the bearing metal layer but also on the rear surface of the backing shell of steel before the copper-containing sliding surface layer was electrodeposited to provide the sliding surface of the bearing. Owing to the copper contained in the electrolyte from which the sliding surface layer is electrodeposited, there will be an electroless deposition of copper on the rear surface of the backing shell and a dissolution of a corresponding amount of nickel from said rear surface while the backing shell is held in the electrolyte from which the sliding surface layer is electrodeposited. The rear nickel layer must be electrodeposited in a thickness which will allow for said loss of nickel, which will depend on the ratio of the molar volumes of copper and nickel. That ratio is 1:0.93. Because the rear nickel layer is electrodeposited in a thickness of 2 micrometers, the nickel layer on the rear surface of the bearing had a thickness of 1.07 micrometers after the deposition of the sliding surface layer and that rear nickel layer was covered with a copper layer having a thickness of 1 micrometer.

To protect the backing shell from corrosion for a sufficiently long time so that it can be kept in storage for a long time, the bearing which had been provided with a sliding surface layer was completely coated with a tin-base or lead-tin-base corrosion-resisting layer in a thickness of about 1 micrometer. Under the action of heat a brittle copper-tin phase will be formed by diffusion between said tin-containing corrosion-resisting layer and the cemented copper and in dependence on the ratio of the thicknesses of the copper and tin layers the entire copper and tin may entirely be transformed to a copper-tin phase of a residual amount of copper or tin may be left.

When the sliding surface bearing had been subjected to a trial operation on a test stand under suitable testing conditions, the corrosion-resisting layer provided on the rear surface of the backing shell was found to have an uniform pattern resulting from bedding-in and a very uniform appearance. In contrast, a bearing which had been manufactured under the same conditions but without an interlayer of nickel on the rear surface of the backing shell showed after a corresponding trial operation that the corrosion-preventing layer on the rear surface of the backing shell had been displaced in part and detached in part. This resulted in operation in fractures of the sliding surface layer and in a higher wear of the electrodeposited sliding surface layer in the regions which register with the areas in which the corrosion-resisting layer had been displaced or detached.

We claim:

1. In a process of manufacturing a sliding surface bearing comprising providing a backing shell of steel having a forward surface and a rear surface, depositing a bearing metal layer on said forward surface of said backing shell, electrodepositing a copper-containing sliding surface layer over said bearing metal layer, and coating said backing shell throughout said rear surface with a tin-containing corrosion-resisting layer after said sliding surface layer has been electrodeposited, the improvement comprising covering said backing shell throughout said rear surface with an electrodeposited nickel layer before said sliding surface layer is electrodeposited over said bearing metal layer.

2. The improvement set forth in claim 1 as applied to the manufacture of a sliding surface bearing comprising an intermediate layer of nickel between said bearing metal layer and said sliding surface layer, wherein said nickel layer on said rear surface of said backing shell is electrodeposited during the time in which said intermediate layer of nickel is electrodeposited on said bearing metal layer.

3. The improvement set forth in claim 1, a rear copper-containing layer is electrodeposited over said rear surface of said backing shell as said sliding surface layer is electrodeposited over said bearing metal layer and said tin-containing corrosion-resisting layer is deposited on said rear copper-containing layer.

* * * * *